Figure 2:
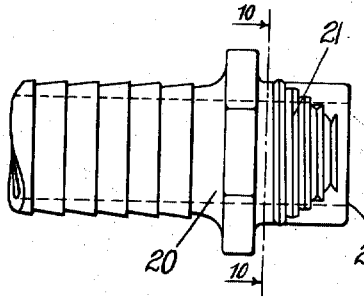

W. A. LORENZ.
COUPLING.
APPLICATION FILED FEB. 23, 1911.

1,008,551.

Patented Nov. 14, 1911.

WITNESSES
E. H. Lorenz
K. E. Peiler

INVENTOR
William A. Lorenz

COLUMBIA PLANOGRAPH CO., WASHINGTON, D. C.

UNITED STATES PATENT OFFICE.

WILLIAM A. LORENZ, OF HARTFORD, CONNECTICUT.

COUPLING.

1,008,551. Specification of Letters Patent. Patented Nov. 14, 1911.

Application filed February 23, 1911. Serial No. 610,212.

*To all whom it may concern:*

Be it known that I, WILLIAM A. LORENZ, a citizen of the United States, residing at Hartford, in the county of Hartford and State of Connecticut, have invented new and useful Improvements in Couplings, of which the following is a specification.

This invention relates to couplings for hose and the like, and is adapted to form a rapid and efficient coupling therefor, and to be moreover of a form easy to manufacture.

In the drawings my invention is shown embodied in a coupling adapted for air hose or the like.

Figure 1:
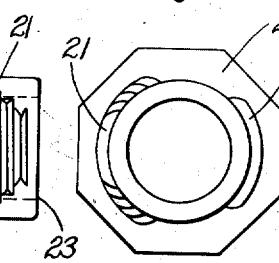
Figure 3:
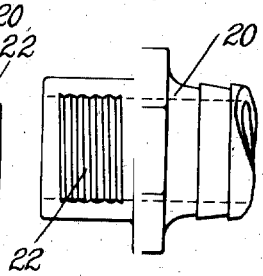
Figure 5:
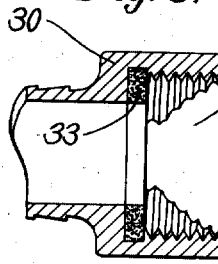
Figure 4:
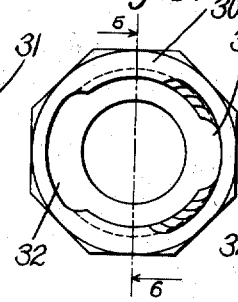
Figure 6:
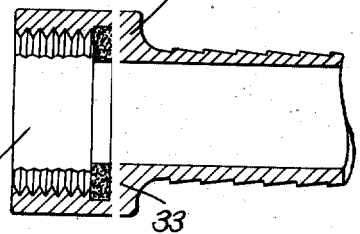
Figure 7:
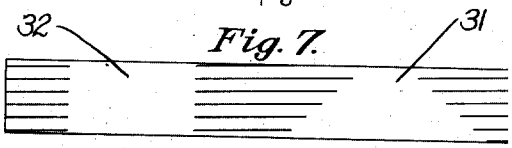
Figure 8:
Figure 9:
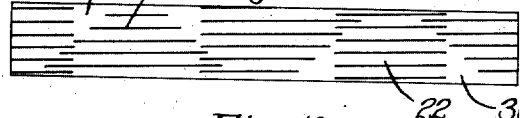
Figure 10:
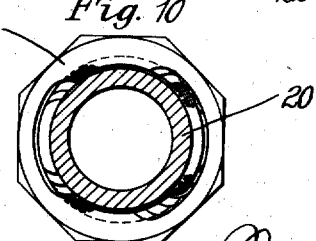

Figure 1 shows an end view of the male member of the coupling. Fig. 2 shows an elevation of one side thereof, and Fig. 3 shows an elevation of the other side thereof. Fig. 4 shows an end view of the female member of the coupling. Fig. 5 shows a section on the line 5—6, of Fig. 4, looking in the direction of the arrow 5. Fig. 6 shows a section on the line 5—6 of Fig. 4, looking in the direction of the arrow 6. Fig. 7 shows a development of the threads of the female member in a diagrammatic form. Fig. 8 shows a similar development of the threads of the male member. Fig. 9 shows in a diagrammatic form the engagement of the threads when the couplings have been turned one-half of a revolution. Fig. 10 shows an end view of the members engaged and turned one-half revolution, the section being taken at the line 10—10 of Fig. 2, looking in the direction of the arrow.

The two members of the coupling are formed with interrupted single screw threads. On the male member 20, shown in Figs. 1, 2 and 3, the threads are interrupted to form two series of segments 21 and 22. In the series 21 the thread segments are formed of varying lengths, the variation being substantially uniform, as shown in Fig. 8. The shortest thread segment is at the outer end of coupling 20. Series 22 is formed of thread segments of substantially equal length, as shown in Figs. 3 and 8. The length of the segments of series 22 is substantially equal to the average length of the segments of series 21.

The female member 30 is formed with a single thread, interrupted to form recesses corresponding substantially in form to the series of thread segments of the male member 20. Thus recess 31 is formed the widest at its outer end, and tapering from there inward, as is clearly shown in Fig. 7. Recess 32 is formed with parallel sides and slightly wider than the thread segments of series 22. At the inner end of the threads of member 30 is placed a gasket 33. This may be held in an undercut recess, as shown, in order to prevent its falling out when the coupling members are apart. The length of the threaded part in the male member 20 and the depth of the threaded part in the female member 30 are so proportioned that when the segments 21 are placed in register with the recess 31, and similarly the thread segments 22 in register with recess 32, the male member 20 can be entered or mated into the female member 30 until the end 23 of the male member abuts on the gasket 33, and at that time, if the members be turned upon each other, the threads will properly engage.

It is apparent that this coupling will be most efficient if the members be turned but one-quarter of a turn upon each other, and ordinarily this would be the case. If however, through wear of the gasket, or other cause, the members be turned one-half turn, the coupling still cannot become disengaged. This is clearly shown in Fig. 9 where it is apparent that the wide inner end of series 21 engages the threads on either side of recess 32, and the threads on the outer end of series 22 engage the threads on either side of the narrow end of recess 31. This arrangement gives a very uniform distribution of the hold at the weakest point, namely at one-half turn, and as is clearly evident in Fig. 10, where the engaging thread portions are section-lined for greater clearness, showing these engaging portions quite evenly distributed around the circumference of the circle. It will be understood, of course, that the ends of all threads are unobstructed; in other words, there is nothing to prevent a complete rotation of one member relatively to the other, or even more than one complete rotation, other than the complete screwing of the members to final seating position. The construction, however, is such that separation of the members cannot occur until returned to first position. In practice, the thickness of the gasket 33 is such, relatively to the pitch of the threads that complete rotation cannot be effected. Each member has threads in series which alternate with the recesses, and the construction is such that relative rotation of the members may be to such an extent as to carry the threads of any series a distance greater than the widths of the recesses, as clearly indicated by comparing Figs. 7 and 8 with Fig. 9. Also by such comparison of figures, it will be seen that the proportions of the length of the threads to the width of the recesses is such that some threads of each series in one member may completely bridge a recess of the other member, so as to interlock at both ends with threads at each side of such recess, thereby equally distributing the hold of the interlocking members. This is clearly illustrated in Fig. 9, wherein it will be seen that the two lower threads of the series 21 are interlocked at both ends with threads of the other member, and the two upper threads of the series 22 are interlocked at both ends with threads of the other member. This structure provides for an equal distribution of the hold of the interlocked members without the employment of any complete or continuous thread; in other words, the structure requires no bridging thread for either of the recesses to form an interlocking continuation of the threads each side of the recesses.

It is apparent that this construction can be modified by slightly varying the relative lengths of the threads of any series shown in the drawings. Another modification might be made by reversing the thread and recess arrangement in the two members of the coupling.

In manufacturing devices of this type, it is desirable to do away with all machine work possible. It is therefore apparent that this type of coupling, wherein the molds may be split in halves in each member, without any fin or other irregularity formed at such joint affecting the threads, may be more readily manufactured than a coupling wherein the threads are continuous about more than one-half its circumference. It is also further apparent that this coupling will readily interchange with the common variety of threaded coupling, and hence may be used in combination therewith, if necessary. It will be seen therefore, that this coupling may be readily manufactured, and in use can be coupled and uncoupled with great ease and speed, and is not liable to become disconnected through turning too far, as is the case of the ordinary type of interrupted thread coupling.

I claim as my invention:—

1. A coupling comprising two members adapted to engage each other, the first member having a threaded part interrupted to form series of thread segments, all the segments of one series varying in length, and all the segments of the other series being substantially equal in length, and the second member having a mating thread interrupted to form recesses corresponding to the thread segments of the first member.

2. A coupling comprising two members adapted to engage each other, the first member having a threaded part interrupted to form two series of thread segments, all the segments of one series varying in length, and all the segments of the other series being substantially equal in length, the length of the segments of the second series being substantially equal to the average length of the segments of the first series, and the second member having a mating thread interrupted to form recesses corresponding substantially in form to the series of thread segments of the first member.

3. In a coupling, the combination of a first member having a threaded part interrupted to form two series of thread segments, the lengths of the segments of one series varying substantially uniformly, and all the segments of the other series being substantially equal in length, and a second member having a threaded part adapted to engage with the threaded part of the first member, and having its thread interrupted to form recesses corresponding substantially to the series of thread segments of the first member.

4. A coupling comprising two members having coacting threads in series alternating with recesses, the threads being unobstructed at their ends whereby relative rotation of the members may carry the threads a distance greater than the width of the recesses, the proportions of the length of threads to the width of recesses being such that some threads of each series of one member may completely bridge a recess of the other member and interlock at both ends with threads at each side of such recess and thereby equally distribute the hold of the interlocked members.

Signed at Hartford, Conn., this 20th day of February 1911.

WILLIAM A. LORENZ.

Witnesses:
E. H. LORENZ,
KARL E. PEILER.